June 16, 1931.  H. BUCHHOLZ  1,810,126
PROCESS OF MAKING MOLDED ARTICLES
Filed Nov. 14, 1923    3 Sheets-Sheet 1
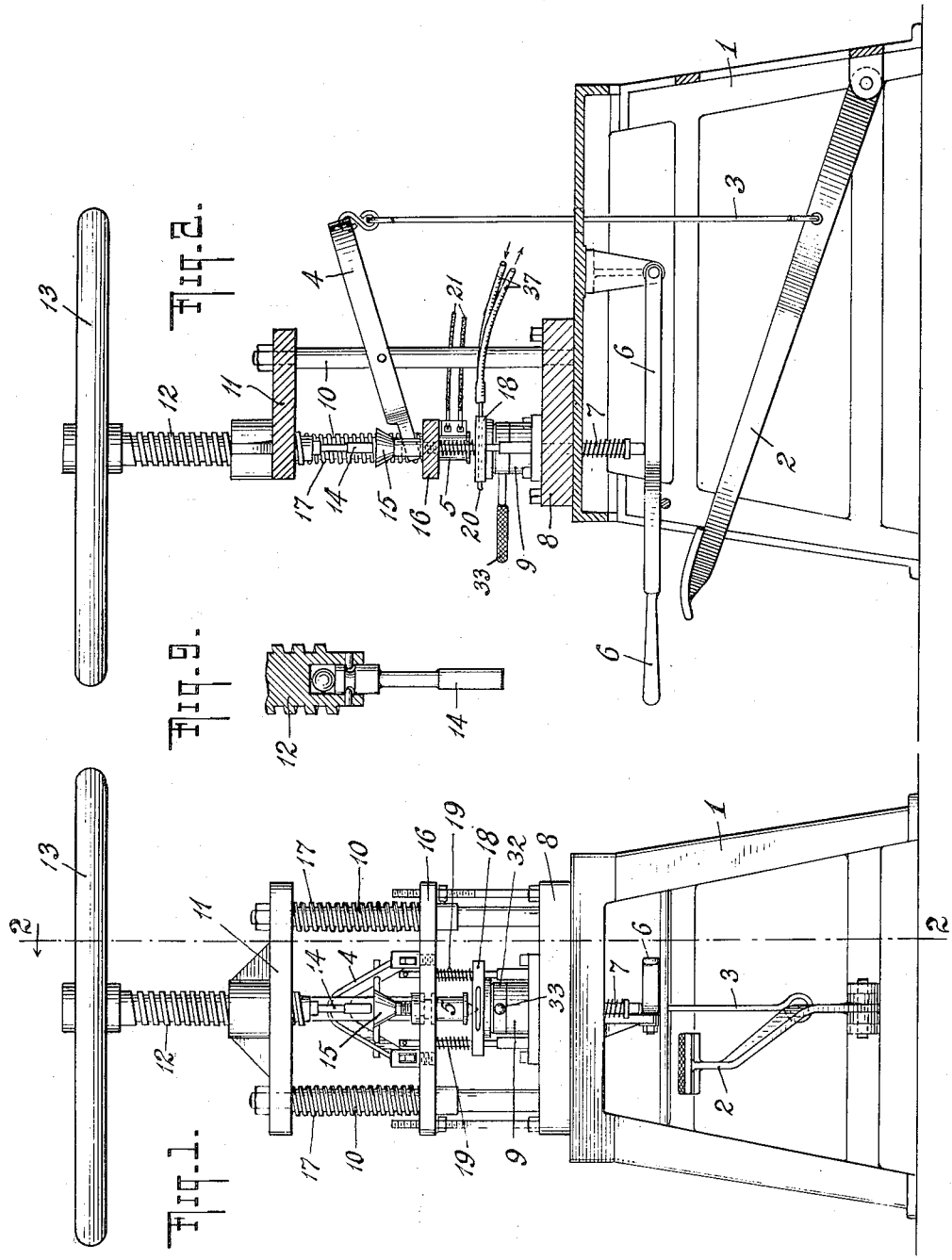
WITNESS
INVENTOR
HERMANN BUCHHOLZ
BY
ATTORNEYS

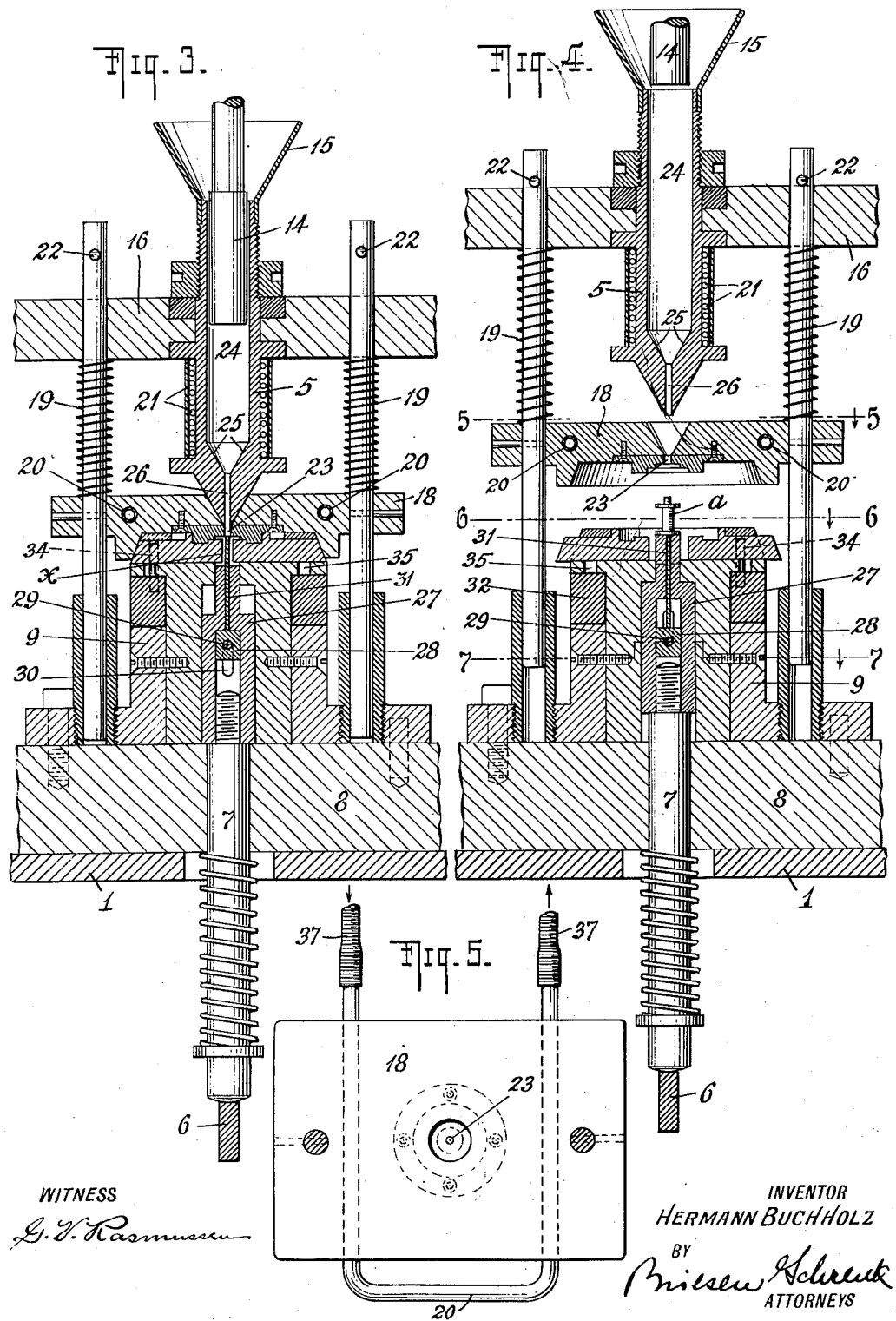

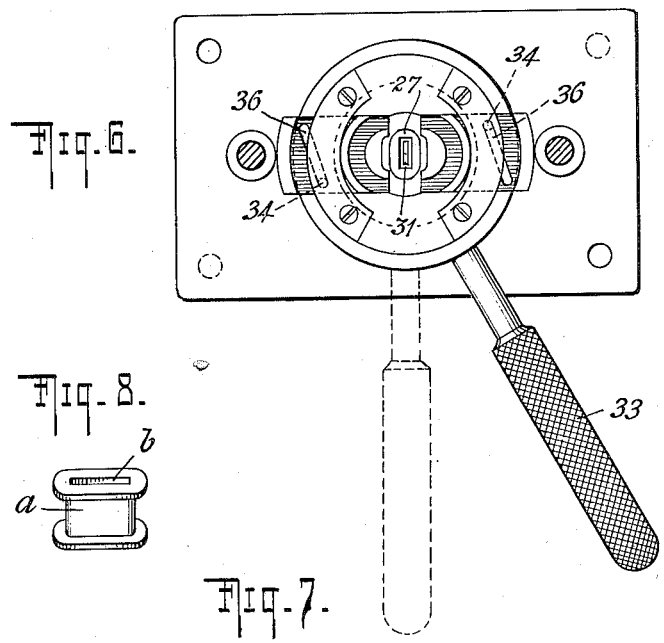
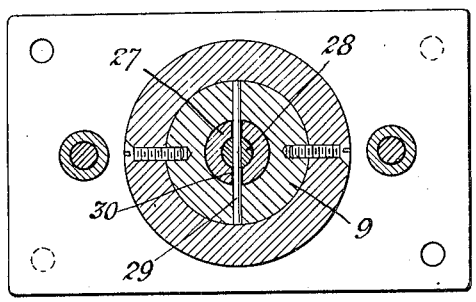
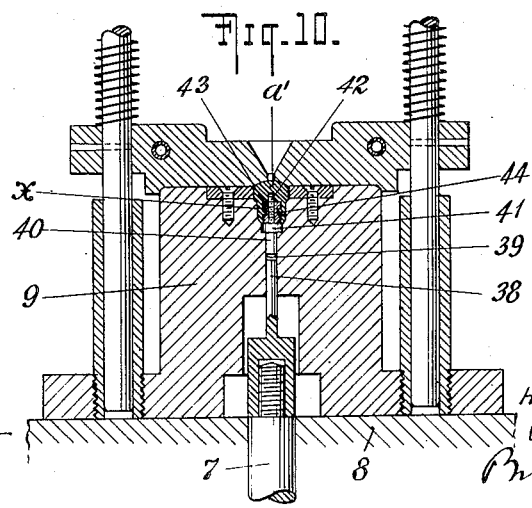

Patented June 16, 1931

1,810,126

UNITED STATES PATENT OFFICE

HERMANN BUCHHOLZ, OF BERLIN, GERMANY, ASSIGNOR TO W. D. GROTE

PROCESS OF MAKING MOLDED ARTICLES

Application filed November 14, 1923. Serial No. 674,630.

My invention relates to a method and means for producing molded articles of a variety of shapes and sizes.

Similar articles have previously been fabricated, principally from phenolic compounds and rubber. However, these articles necessarily were produced in a difficult and expensive manner and the resultant product found to be less satisfactory than articles fabricated in accordance with my invention. Articles made from phenolic condensation products require in the molding operation a gradual hardening in a hot press using preferably sodium hydroxide as a condensing agent and ammonia as a hardening agent. This time consuming chemical treating and physical curing necessitates the employ of multiple cavity molds with their concomitant increased production cost and also precludes any possible reuse of waste material, some of which is always present after the molding operation. Vulcanized rubber also requires curing and the articles must be produced in a hot mold gradually and any particles of waste material thrown away unless the material is again refined.

The principal object of my invention is to produce these articles in an entirely new and improved way employing material requiring no curing or treating and capable of being heated to a moldable condition, squirted into the mold while in this condition and then removed immediately therefrom in the form of a finished solidified product. I preferably use such material as disclosed in my Patent No. 1,568,955 or any acetyl cellulose compound or material having similar properties.

My invention obviates the necessity of multiple cavity molds previously necessary to enable sufficiently rapid production to permit manufacture and yet insures an even greater speed and efficiency in production. This important object is made possible by using the type of material mentioned and squirting it into a non-heated mold so that the finished article can be removed immediately without any chemical or physical treating or curing and consequently any waste material can be saved for reuse.

Another object of my invention is to provide a machine for carrying out this new method which permits a separation of the material in the mold supplying nozzle just outside the mold. This is accomplished by placing the tapered end of the nozzle in contact with the chilled mold and after separation reheating the nozzle insuring plasticity of the molding material.

A machine illustrative of the invention is shown in the accompanying drawings in which Fig. 1 is a front elevation of the machine, Fig. 2 is a sectional elevation taken on the line 2—2 of Fig. 1. Figs. 3 and 4 are sectional views showing the mold and associated parts in two positions. Fig. 5 is a horizontal section taken on the line 5—5 of Fig. 4. Fig. 6 is a horizontal plan taken on the line 6—6 of Fig. 4. Fig. 7 is a section taken on the line 7—7 of Fig. 4. Fig. 8 is a perspective view of the finished molded article. Fig. 9 is an enlarged detail of the pressure plunger. Fig. 10 illustrates a mold suitable for the production of a molded article of different shape than that which is made the basis of the illustrations of Figs. 1 to 9.

The machine comprises a suitable support 1. Associated with the support 1 is the foot lever 2 which through link 3 and arm 4 controls the movement of the feeding device 5. On the support 1 is also mounted the lever 6 which operates the ejector plunger 7.

Carried by the support 1 is a bed plate 8 which supports the mold proper 9. Three upright bars 10 support the head 11. The head 11 is provided with interior screw-threads adapted to co-act with the screw-threads on the stem 12 which is operated by the hand-wheel 13 and controls the up and down movement of the pressure plunger 14. The feeding device 5 comprises a hopper portion 15, through which the material to be molded is introduced into the feeding device 5. The said feeding device 5 is supported by the plate 16 under continuous downward pressure of the springs 17. Intermediate between the plate 16 and the mold 9 is a plate 18 which may be termed a cold plate, cooled through 20, and which is under continuous downward pressure with reference to plate 16 by means of the springs 19. The feeding device 5 is heated preferably electrically as indicated by the terminals 21 of Fig. 2.

From the foregoing general description, particularly appropriate to Figs. 1 and 2 it will be observed that the material to be molded, after being introduced into the hopper 15, is heated in the feeding device 5 by the electric current in a heating element such as the winding 21 until it becomes plastic and soft. The hand-wheel 13 is then rotated and the pressure plunger 14 forced through the hopper 15 into the feeding device 5, said plunger operating to extrude or squirt from the feeding device 5 the requisite amount of fluid molding material into the mold 9 until the same is filled. As soon as said mold is properly filled, the pressure plunger is elevated and thereupon the foot lever 2 is actuated with the result that the feeding device 5 is forced upwardly away from the mold, the plate 18 also rising from the mold as the plate 16 contacts with the pins 22. The mold is thus isolated and can be opened. After it has been opened, the lever 6 is operated to force the finished molded article upwardly to eject the finished molded article from the mold. The foregoing is the general operation of the machine.

Referring next to details of constructions and particularly to Figs. 3 and 4, $x$ represents the space in the mold to be filled by the molding material in Fig. 3 and the finished molded article in Fig. 4. Above the space $x$ in Fig. 3 is the mold mouth or spout 23. With this spout the discharge orifice of the feeding device 5 is brought into direct connection as shown in Fig. 3, this being the normal position of the machine. The interior of the feeding device consists of the chamber 24 having the sloping walls 25 and the contracted discharge duct 26. In the chamber 24 the material to be molded becomes soft and fluid under the influence of the heating coils 21. As the plunger 14 descends through the chamber 24 it forces a proper amount of the molding material through the duct 26 into the chamber $x$ of the mold 9. The duct 26 being constricted, and the material passing therethrough under pressure, serves to progressively, increasingly heat and soften the material in its passage from the chamber 24 into the mold 9. The dimensions of the duct 26 should be made appropriate to the article to be molded, but in every case it will be a narrow passage in which the material to be molded will be exposed to greater heat and fluidity inducing influences than those which prevail in the chamber 24.

In Fig. 3 the plunger 14 is shown as having partially completed its full stroke, and in Fig. 4 the parts are shown in the position they occupy when the molded article has been ejected from the mold by the ejector plunger 7.

The ejector plunger 7 may be of any suitable construction and in the present instance is made with a hollow head 27 in which the block 28 is located. The latter is stationary with respect to the plunger 7 and is maintained in a fixed position, for instance, by means of one or more pins 29 which pass through slots 30 in said plunger 7. The latter is thus capable of vertical sliding movements relatively to the block 28. A core-forming stem 31 is carried by the block 28 and projects lengthwise of a correspondingly formed passage in the operative end of the plunger 7 as shown in Figs. 3 and 4. In the position of the parts shown in Fig. 3, the core-forming stem 31 projects beyond the plunger 7 into the mold and serves to provide the molded article $a$ with a central rectangular core $b$ as shown in Fig. 8. As the ejector plunger 7 is lifted to eject the molded article as shown in Fig. 4, the stem 31, by reason of its connection with the fixed block 28, remains stationary, so that the molded article $a$ is pushed therefrom as also shown in Fig. 4. It will be understood that the physical characteristics of the stem 31 and its presence in or absence from the molding machine depends entirely upon the character of the article being molded. That is to say, if said article $a$ does not include a core, then the machine in question will likewise not include a stem 31; if, on the other hand, the article $a$ includes a core of other than rectanguler shape, the stem 31 will be correspondingly formed to produce the desired results.

As previously stated herein, the mold 9 is capable of being opened at the proper time to facilitate the ejection of the molded article $a$, it being understood that this opening operation may be performed in any suitable manner. In the illustrated example, the means whereby the mold 9 is opened comprises a ring 32 rotatably mounted upon the mold support as shown in Figs. 3 and 4, a handle 33 extending radially outward from said ring 32 to facilitate its operation. The ring is provided with pins 34 which extend upwardly through suitable slots 35 in the mold supports and into slots 36 in the sections of the mold 9; the slots 36 as shown in Fig. 6 extending at inclinations which intersect the rotative paths of the pins 34. Thus, as the handle 33 is moved from the dotted line position in Fig. 6 to the solid line position therein, the mold sections will be moved to the open position shown in Fig. 4, by reason of the fact that the co-operative action of the pins 34 of the slots 36 will be such as to cam the mold sections away from each other. Likewise, if the handle 33 is moved in the opposite direction back to the dotted line position in Fig. 6, the mold sections will be closed and brought to the position illustrated in Fig. 3.

The means whereby the plate 18, which hereinbefore has been termed a cold plate, is cooled may, as shown in Fig. 5, comprise a tube passing through said plate 18 and having its opposite ends connected by means of rubber tubing 37 or the like with a source of cooling medium such as cold water, which, by circulating through tube 20, serves to abstract heat from the plate 18.

In Fig. 10 I have shown an arrangement for utilizing the present process and the apparatus for molding an article which includes an internally screw-threaded bushing. In the form illustrated, the plunger 7 is provided with a short rod 38, vertically movable in a passage 39, located in the mold 9 and connecting with the space $x$ thereof. The arrangement being described further includes a stem 40, having a collar 41 from which projects in the opposite direction a screw-threaded member 42. In practice the stem 40 is inserted into the passage 39 in which it is supported by the collar 41 in such a manner that the screw-threaded member 42 projects upwardly in the mold space $x$. Prior to the introduction of the material into the mold, the pre-determined bushing 43 is screwed upon the member 42 into engagement with the collar 41. The bushing 43 is preferably provided with an annular recess 44 upon its outside periphery. Thus, when the material which is to form the article $a'$ is introduced and fashioned in the mold 9, the bushing will be embedded in said material which will enter the annular recess 44 and thereby securely connect the article $a'$ and the bushing 44 in fixed relation to each other.

It will, of course, be understood, that the machine, instead of being manually operated in the manner herein described, may be automatically operated in all of its parts by suitable mechanism. It will further be understood that the mold 9 may be duplicated to any extent in the machine, so that successive molds may be brought into proper operative relation with the forming means and the machine thus operate in progressive steps to increase the speed of operation and output; similarly the machine may include a plurality of molds and a plurality of co-operating devices such as herein shown in order to coincidentally produce a plurality of articles.

The machine is particularly adapted for the use of a molding material having the characteristics of a non-inflammable organic material, such for example, as a material the base or main constituent of which is acetyl cellulose which softens and fluidifies at temperatures between 80° C. and 120° C.

Other material may however be employed provided its melting temperature is not too high—say over 350° C., and, of course, provided the material is in other respects, adequate to and satisfactory for the ultimate objects for which the finished molded article, made therefrom, is designed and has properties similar to acetyl cellulose.

Various changes in the specific form shown and described may be made within the scope of the claims without departing from the spirit of my invention.

I claim:

1. The process which comprises heating the material to be molded until the same acquires flowing characteristics, then forcing said material directly from the point of heating through a relatively constricted passage under pressure to increase its flowing characteristics and in this condition forcing it into the mold and cooling the mold during the introduction thereto of the fluid material.

2. The process which comprises heating the material to be molded until the same acquires flowing characteristics, then forcing said material through a relatively constricted passage under pressure to increase its flowing characteristics and in this condition forcing it into the mold, cooling the mold during the introduction thereto of the fluid material and separating the mold from the passage through which the material is introduced thereto immediately after the mold is filled.

3. The process of molding articles from an acetyl cellulose compound consisting of heating the material to a plastic state, passing the material through a constriction, then squirting the material directly into the mold and simultaneously cooling the outer extremity of the constriction for separating the supplying material in the constriction from the material in the mold.

4. The process of molding articles from a non-inflammable, cellulosic material comprising heating said material to render the same fluent, squirting said fluent material at the point of heating through a restricted orifice into a mold to maintain the temperature and fluidity of the material during admission to the mold to fill the same, maintaining said mold at a temperature below the solidifying point of the material so that the material filling the mold is immediately solidified, and immediately ejecting the molded article from the mold.

5. The process of molding articles from a material having acetyl cellulose as its base or main plastic constituent, comprising heating said material to render the same fluent, squirting said fluent material through a heated, restricted orifice into a mold to work said material and maintain its temperature and fluidity during admission to the mold to fill the same, said mold being at a temperature below the solidifying point of said material so that the material filling the mold is immediately solidified, and ejecting the molded article from the mold.

6. The process of molding articles from a non-inflammable cellulosic material comprising supplying said material to a passage provided proximately at a lower portion thereof with a narrowly restricted orifice, heating said passage and orifice to render said material fluent, bringing said orifice and a corresponding orifice of a mold together, said mold being at a temperature below the solidifying point of said material, applying pressure to said passage to squirt said fluent material into said mold to fill the same, and immediately separating said orifices and ejecting the molded article.

7. The process of molding articles from a non-inflammable cellulosic material comprising confining said material in a passage provided with a narrowly restricted orifice, heating said passage and orifice to render said material fluent, bringing said orifice and a corresponding orifice of a mold together, forcing said fluent material from said passage through said orifices to fill the mold, said mold having a temperature below the solidifying temperature of said material so that the latter is immediately solidified in said mold and orifices and immediately separating said orifices to permit reheating of said passage orifice and ejecting the article from said mold.

8. The process of molding articles from an organic plastic material capable of being solidified substantially in final condition without curing treatment, comprising heating said material to render the same plastic and squirting said material into a mold having a temperature below the solidifying temperature of said material, so that said material is immediately solidified ready for ejection from the mold.

9. The process of molding articles from an organic plastic material capable of solidifying directly in stable hardened form, comprising heating said material to render the same plastic, squirting said material under pressure through a restricted orifice into a mold having a temperature below the solidifying temperature of said material, so that said material is rapidly solidified, and then ejecting the article from the mold.

10. The process of molding articles from an organic plastic material capable of solidifying directly in stable hardened form, comprising confining the heated plastic material in a passage having a restricted discharge orifice, bringing said orifice into mating relation with the corresponding orifice of a mold having a temperature below the solidifying temperature of said material, squirting said material into said mold to fill the same, separating said orifices in a direction parallel with the direction of extent of the openings thereof, and ejecting the article from the mold.

11. The process of molding articles from an organic plastic material capable of solidifying directly in stable hardened form, comprising heating said material to plastic condition in a passage having a restricted discharge orifice, bringing said discharge orifice into mating contact with the receiving orifice of a mold having a temperature below the solidifying temperature of said material, applying pressure to said material to squirt the same into and fill said mold, so that the said material is rapidly solidified in said mold and in said orifices, relieving said pressure on said material, separating said orifices in a direction parallel with the direction of extent of the openings thereof to withdraw from said discharge orifice the solidified portion of material therein, and ejecting the article from the mold.

In testimony whereof I have hereunto set my hand.

HERMANN BUCHHOLZ.